United States Patent [19]
Liu et al.

[11] Patent Number: 6,141,076
[45] Date of Patent: Oct. 31, 2000

[54] SPATIAL LIGHT MODULATORS CONSTRUCTED FROM FERROELECTRIC LIQUID CRYSTAL DEVICES WITH TWISTED STRUCTURE

[75] Inventors: Jian-Yu Liu; Kuang-Yi Wu; Seng-Ieong Wong, all of Boulder, Colo.

[73] Assignee: Chorum Technologies, Inc., Richardson, Tex.

[21] Appl. No.: 08/980,447

[22] Filed: Nov. 28, 1997

[51] Int. Cl.[7] .................................................. G02F 1/141
[52] U.S. Cl. ........................................ 349/134; 349/171
[58] Field of Search .................................. 349/133, 134, 349/171, 172, 173

[56] References Cited

U.S. PATENT DOCUMENTS

| | | | |
|---|---|---|---|
| 4,989,941 | 2/1991 | Soref | 350/96.18 |
| 5,172,257 | 12/1992 | Patel | 359/84 |
| 5,214,523 | 5/1993 | Nito et al. | 359/100 |
| 5,539,555 | 7/1996 | Wand et al. | 359/100 |
| 5,596,661 | 1/1997 | Henry et al. | 385/24 |
| 5,606,439 | 2/1997 | Wu | 349/117 |
| 5,646,704 | 7/1997 | Kodera | 349/134 |
| 5,680,490 | 10/1997 | Cohen et al. | 385/24 |
| 5,781,265 | 7/1998 | Lee | 349/171 |
| 5,809,190 | 7/1998 | Chen | 385/43 |
| 5,844,652 | 12/1998 | Takatori | 349/139 |
| 5,847,790 | 12/1998 | Andersson et al. | 349/100 |
| 5,905,484 | 5/1999 | Verhulst | 349/98 |
| 5,905,558 | 5/1999 | Tokunaga et al. | 349/149 |

FOREIGN PATENT DOCUMENTS

WO 97/32236  4/1997  WIPO ............................ G02F 1/141

OTHER PUBLICATIONS

Liquid Crystals Applications and Uses, vol. 3, by Birendra Bahadur (1992).

Ouchi, Yukio, Kideo Takezoe and Atsuo Fukuda: *Switching Process in Ferroelectric Liquid Crystals; Disclination Dynamics of the Surface Stabilized States*; Japanese Journal of Applied Physics; vol. 26, No. 1; Jan. 1987; pp. 1–14.

Clark, Noel A. And Swen T. Lagerwall; *Submicrosecond bistable electro–optic switching in liquid cryastals*; Appl. Phys. Lett 36(11) Jun. 1, 1980.

Inoue, Kyo, Norio Takato, Hiromu Toba and Masao Kawachi; *A Four–Channel Optical Waveguide Multi/Demultiplexer for 5–GHz Spaced Optical FDM Transmission*; Journal of Lightwave Technology; vol. 6,. No. 2; Feb. 1988; pp. 339–345.

Kuznetsov, M.; *Cascaded Coupler Mach–Zehnder Channel Dropping Filters for Wavelength–Division–Multiplexed Optical Systems*; Journal of Lightwave Technology; vol. 12, No. 2; Feb. 1994; pp. 226–230.

Nosu, Kiyoshi, Hiromu Toba and Katsushi Iwashita; *Optical FDM Transmission Technique*; Journal of Lightwave Technology; vol. Lt–5, No. 9; Sep. 1987; pp. 1301–1307.

Takato, Norio; Toshimi Kominato, Akio Sugita, Kaname Jinguji; Hiromu Toba and Masao Kawachi; *Silica–Based Integrated Optic Mach–Zehnder Multi/Demultiplexer Family with Channel Spacing of 0.01–250 nm*; IEEE Journal on Selected Areas in Communications; vol. 8(6), Aug. 1990; pp. 1120–1127.

Verbeek, B.H, C.H. Henry, N.A. Olsson, K.J. Orlowsky, R.F. Kazarinov and B.H. Johnson; *Integrated Four–Channel Mach–Zehnder Multi/Demultiplexer Fabricated with Phosphorous Dopes $SiO_2$ Waveguides on Si*; Journal of Lightwave Technology; Jun. 1988; pp. 1011–1015.

*Primary Examiner*—Kenneth Parker
*Attorney, Agent, or Firm*—Sheridan Ross P.C.

[57] ABSTRACT

A hybrid analog/binary electro-optic modulator using a twisted ferroelectric liquid crystal structure is provided. Ferroelectric liquid crystals with a tilt angle of between about 20° and about 25°, preferably about 22.5° are used. Rubbing directions for the two cell walls (relative to one another) can be varied from about 45° to about 90°. In one embodiment, a weak buffing force is used resulting in a relatively weak anchoring energy at the surface, aligning the liquid crystal molecules without locking the molecules into the buffing directions and a high pre-tilt structure for the molecules close to the surface boundaries. In one embodiment, strong buffing is used with buffing directions offset about 45°. Use of this invention provides relatively fast response time, low required driving voltage, high contrast, and/or the ability to achieve both analog and binary operations.

16 Claims, 12 Drawing Sheets

SPATIAL LIGHT MODULATORS CONSTRUCTED FROM FERROELECTRIC LIQUID CRYSTAL DEVICES WITH TWISTED STRUCTURE

This invention relates, in general, to ferroelectric liquid crystal devices. In particular, the invention relates to spatial light modulators made from ferroelectric liquid crystal materials.

BACKGROUND INFORMATION

Ferroelectric liquid crystal (FLC) substances have been widely used as electro-optic modulators in applications such as flat panel displays, spatial light modulators, and specialized optical image processors, where switching times on the order of microseconds are needed. They are generally fabricated into surface-stabilization structures, so-called SSFLC (surface stabilized ferroelectric liquid crystal), for binary operation. (N. A. Clark et al., "Submicrosecond bistable electro-optic switching in liquid crystals," Appl. Phys. Lett. 36(11), p.# 899, 1980.).

A typical SSFLC modulator is made by the following process. Transparent electrode (indium-tin-oxide) coated glass substrates are generally used for the cell walls. They are spin-coated with alignment material, for example nylon or polyimide, and then rubbed with silk to form an alignment layer. The two substrates are brought together with the rubbing directions parallel or anti-parallel to each other. The cell thickness is kept much smaller than the pitch length of the liquid crystal material such that the liquid crystal helix is suppressed by the cell walls (glass substrates). The assembly creates a "chevron" structure when parallel rubbing is applied or a "quasi-bookshelf" structure when antiparallel rubbing is applied to the substrates.

In these structures, liquid crystal molecules are switched between two states when positive and negative electrical fields are applied to them. This is due to the interaction between the applied electric field and the spontaneous polarization of the molecules. By selecting a ferroelectric liquid crystal material that has an angle of 45° between the two states, the modulator becomes a switchable waveplate. By further designing the thickness of the liquid crystal cell such that $\Delta n\ d = \lambda/2$, the modulator acts as a switchable half-wave plate that can rotate the input linear polarization by 0° or 90°. The parameters $\Delta n$ and d are the optical birefringence and the thickness of the liquid crystal material, respectively, and $\lambda$ is the operating wavelength. An input optical signal with its linear polarization aligned to one of the liquid crystal states experiences no polarization modulation. (The optical signal experiences only a phase delay.) When the molecules are switched to the opposite state at 45°, the polarization of the optical signal is rotated 90°. A simple on/off switch can be constructed based on this ferroelectric liquid crystal modulator when two polarizers are added to the input and output of the device.

In the SSFLC mode, because the helix of the liquid crystal molecules is suppressed by the surface anchoring energy provided by the alignment layer, no analog modulation is allowed. The device operates in a binary switching mode.

Another type of ferroelectric liquid crystal modulator based on a twisted structure was disclosed by Patel, in U.S. Pat. No. 5,172,257. In this type of twisted ferroelectric liquid crystal modulator, the glass substrates are strongly rubbed or "buffed" at an angle of 90° relatively to each other. Ferroelectric liquid crystals with a large tilt angle, about 90°, are used to fill the cell gap. Because of the strong buffing, liquid crystal molecules adjacent to both cell walls align to the buffing directions. The smectic layer of the liquid crystal is formed with its layer normal laid at 45° relative to the two rubbing directions. Without the electrical field, the twisted structure waveguides the polarization of the input light to rotate the polarization by 90°. With application of electrical fields, the waveguiding effect is distorted and the polarization is rotated partially. With the modulator sandwiched in between two crossed or parallel polarizers, analog intensity modulation can be obtained.

In this analog modulation case, the device is modulated between 0 and V or 0 and −V voltage states. When application voltage $V > V_{sat}$ is used (where $V_{sat}$ is the saturation voltage) the molecules are switched at 0° and 90° positions (because a 45° tilt angle material is used). With parallel or vertical polarization input to the modulator, only phase modulation (from $n_e d/\lambda$ to $n_o d/\lambda$, or vice versa, (where $n_o$ is the ordinary refractive index of the liquid crystal and $n_e$ is the so-called extra-ordinary refractive index) is obtained and no intensity modulation results.

SUMMARY OF THE INVENTION

The present invention provides a hybrid analog/binary electro-optic modulator using a twisted non-surface-stabilized ferroelectric liquid crystal structure. Ferroelectric liquid crystals with a tilt angle of between about 20° and about 25°, preferably about 22.5° are used. Rubbing directions for the two cell walls (relative to one another) can be varied from about 45° to about 90°. Use of this invention provides relatively fast response time, low required driving voltage and/or the ability to achieve both analog and binary operations.

DETAILED DESCRIPTION OF THE PREFERRED EMBODIMENT

Electro-optic modulators made of twisted nematic (TN) are well known devices in the field of spatial light modulators. Most current flat panel displays use TN as the modulation base. Application of electro-optic modulators to telecommunications systems presents different sets of performance goals, including switching times, voltage requirements and digital/analog operations, to which the present invention is believed particularly suited. The present invention is believed to depart from previous techniques at least in terms of the basic physical insight taught by this invention, down to the molecular level, and optical properties.

Figure 1:
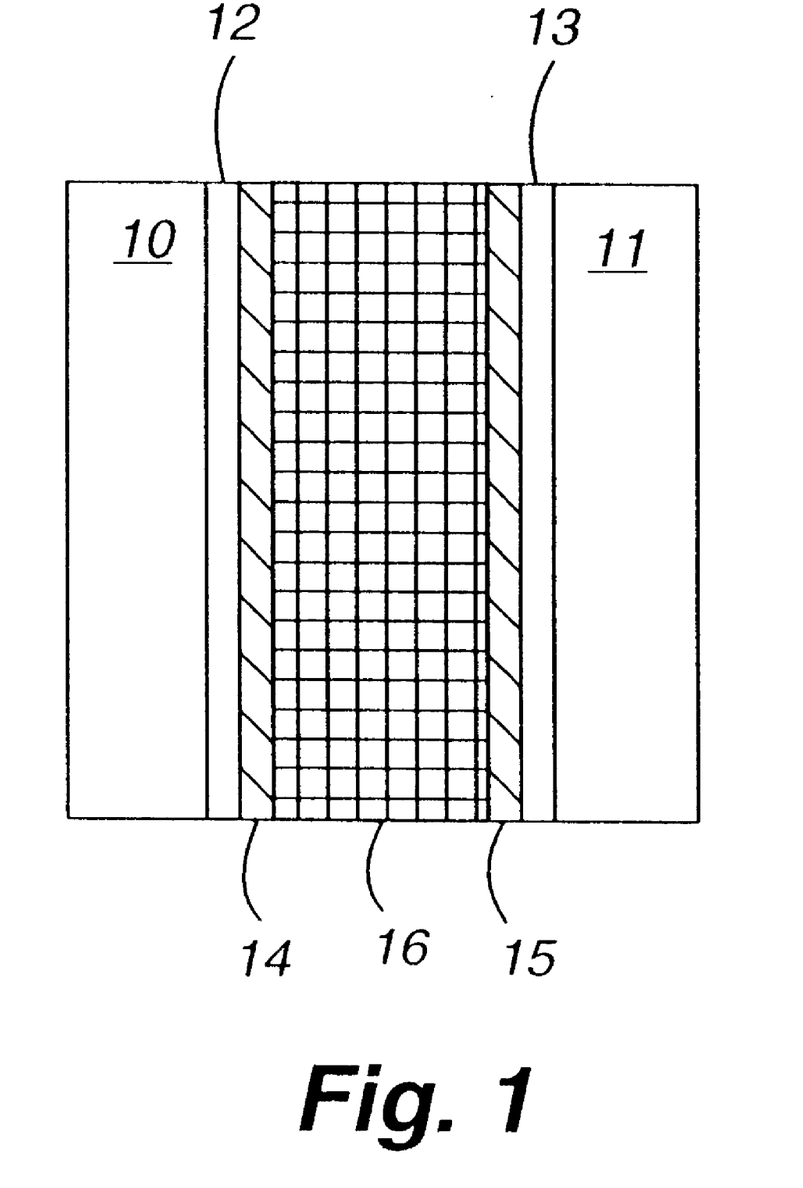
FIG. 1 illustrates the cross-section of a ferroelectric liquid crystal modulator with a twisted structure.

FIG. 1 illustrates the basic elements and structure used in an embodiment of this invention to obtain a twisted ferroelectric liquid crystal modulator. Transparent electrodes, such as indium-tin-oxide electrodes 12 and 13 are deposited onto substrates such as glass substrates 10 and 11. Alignment layers 14 and 15, formed from materials such as polyimide, are applied, e.g. by spin-coating, onto the substrates, followed by a standard curing procedure, when appropriate for these alignment layers.

In one embodiment, the alignment layers are treated to create a preferably weak anchoring force, such as by lightly rubbing along a predetermined direction. The anchoring force is used to align the liquid crystal molecules adjacent to the alignment layers. The two substrates are brought together to define a space therebetween, preferably with the rubbing directions being different from one another to define a twist angle therebetween. In some embodiments of the present invention, twist angles of about 90° and 44° are provided between the two glass substrates. Ferroelectric liquid crystal material, such as that sold under the trade designation 1026, available from Chisso America, Inc., is used to fill into the cell gap. The material's cone angle is 22° at room temperature.

Figures 2A, 2B, 2C:
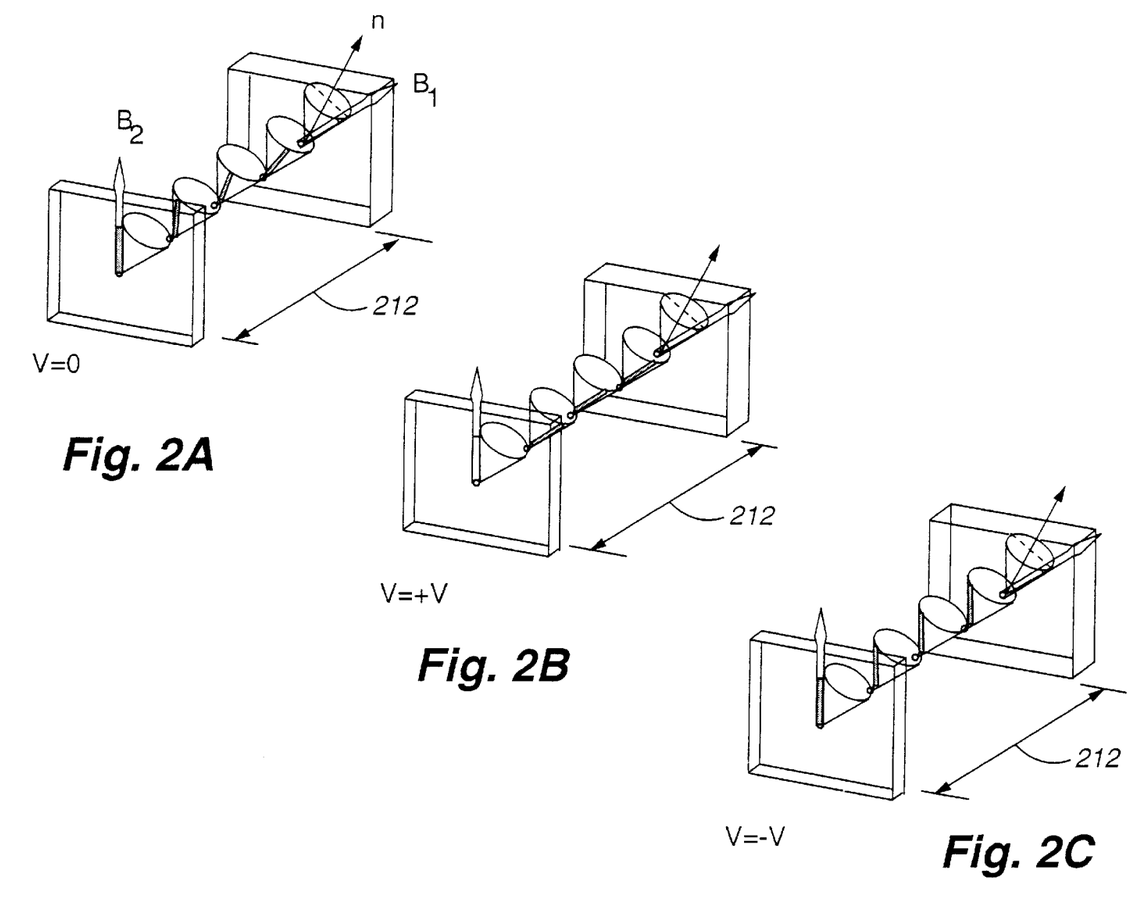
FIGS. 2A, 2B and 2C are schematic perspective views that illustrate the alignment of a molecular director within the twist structure for different voltages.

Ferroelectric liquid crystal has a helical structure. As shown in FIGS. 2A–2C, molecules rotate ($B_1$, $B_2$) around the cone (with an angle of $\theta_t$) and form a helix between smectic layers. In the surface stabilized mode, the cell thickness 212 is designed to be thin and the surface anchoring energy is strong. This combined force suppresses the helix and results in two eigen positions for the liquid crystal molecules. Therefore, with electric fields applied to the cell (FIGS. 2B and 2C), the molecules switch between the two far ends of the cone that modulate the light beam in a binary fashion. In the conventional parallel or antiparallel buffing case, the smectic layer normal is formed parallel to the buffing direction. The liquid crystal molecular director stays at the two sides of this layer normal with a tilt angle of $\theta_t$.

Figure 3A:
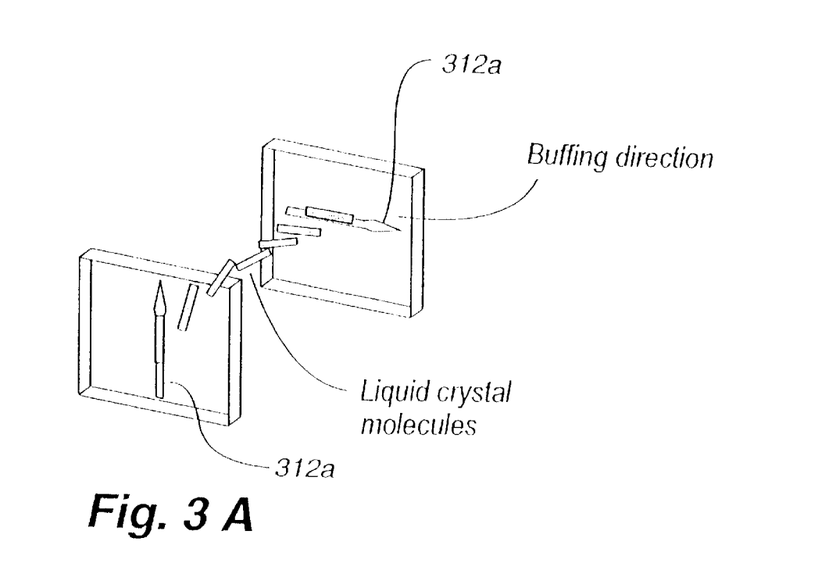
FIGS. 3A and 3B show the two buffing schemes to achieve twists in ferroelectric liquid crystal structures.
Figure 3B:
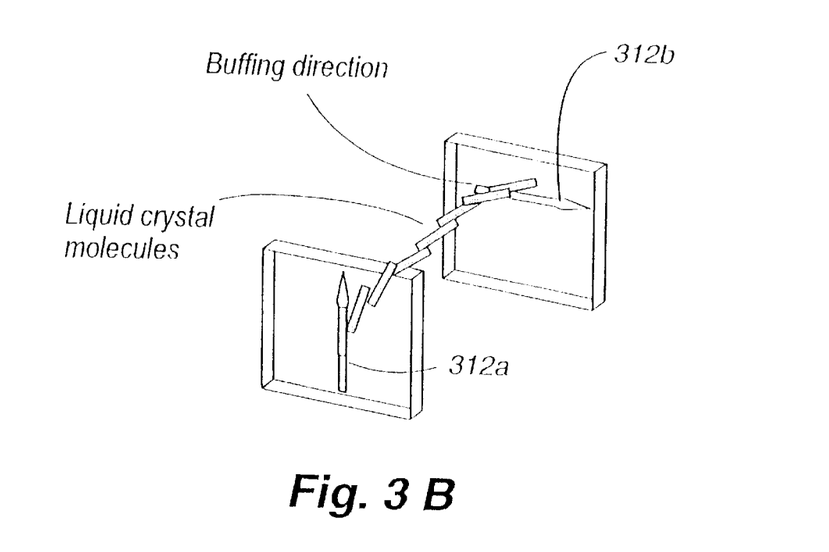

In the present invention, because the buffing directions 312a, 312b (FIGS. 3A–B) of the substrates are twisted relative to each other, the molecules follow their intrinsic helical pattern in the vicinity of both substrate surfaces. It is believed this twist angle results in a more stable alignment environment for the liquid crystal molecules and is, therefor, easier to fabricate.

The buffing strength can also play an important role in this twisted cell fabrication. In contrast to the conventional strong buffing of the alignment layer in at least some previous devices (e.g. as described in U.S. Pat. No. 5,172,257) in embodiments of the present invention, the 90° twisted structure is preferably constructed onto the alignment layers with a light or weak buffing force. Those of skill in the art will understand the distinction between light and strong buffing or rubbing and how to accomplish such buffing. The weak buffing force used in this embodiment results in a relatively weak anchoring energy at the surface. This weak anchoring force aligns the liquid crystal molecules but does not lock the molecules into the buffing directions. This provides freedom for the smectic layers to be formed within the structure. In the cell processing, it has been observed that strong buffing results in a modulator with relatively high scattering, using such 90° twist cell. This is believed to be due to the strong anchoring force distorting the smectic layer.

Figure 4:
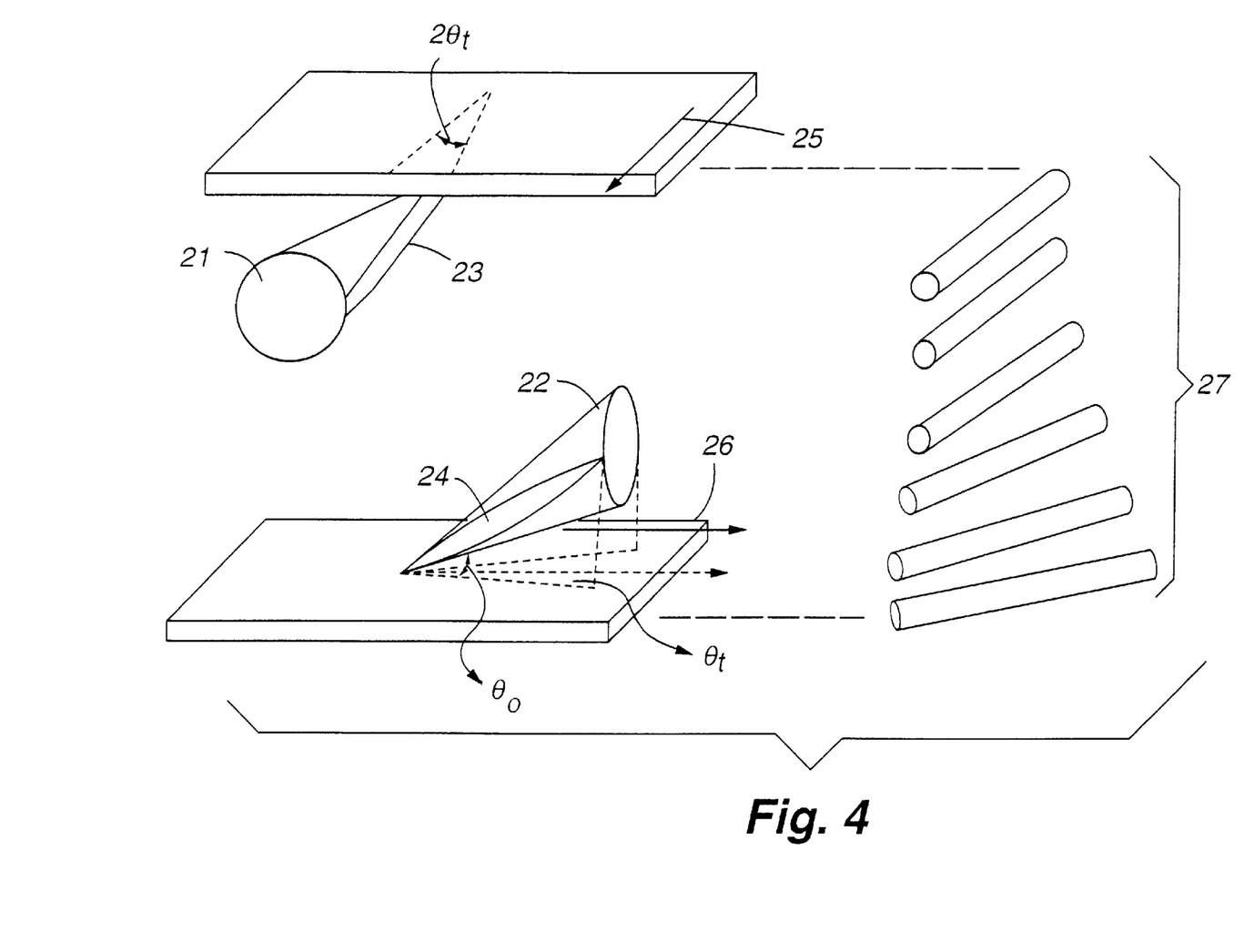
FIG. 4 is a partially exploded schematic perspective view illustrating a high contrast binary twisted ferroelectric liquid crystal modulator according to an embodiment of this invention.

Light buffing also creates a pre-tilt for the liquid crystal molecules at an angle $\theta_0$ (FIG. 4) relative to the cell walls 25, 26, and creates further tilt, away from the buffing direction, at an angle of $\theta_t$. FIG. 4 illustrates this molecular alignment geometry with a twist angle of 90° between the substrates.

With this pre-tilt angle, the resultant effective cone angle is smaller than the material's cone angle. Unlike the strong surface anchoring case, (which is believed to result from strong buffing) where the liquid crystal molecules are laid in parallel to the buffing directions, weak buffing results in a high pre-tilt structure for the molecules close to the surface boundaries. In the parallel alignment case, where the buffing direction is set to 0° or 180°, the structure is generally referred as a chevron or a quasi-bookshelf. Without wishing to be bound by any theory, strong buffing is believed to bind or lock the molecules to the alignment layers and the result of the alignment quality is generally more scattered. The multi-domain texture of a liquid crystal cell resulting from strong buffing therefore, has a high transmission loss which, in some traditional configurations, is believed to be generally detrimental, particularly for telecommunications switching and similar applications.

Although a weak anchoring force (such as is achieved using weak buffing) is provided in at least some embodiments of the present invention, in other embodiments, strong buffing can be used, providing a strong anchoring force. While the weak buffing embodiment provides excellent contrast, even greater contrast can be achieved when strong anchoring (e.g. by strong buffing) is provided. In this embodiment, however, the buffing angles of the substrates are at an angle, with respect to one another, of less than 90°, preferably at about 45°, and the ferroelectric liquid crystal material has a room temperature cone angle intermediate between this angle and 0°, preferably about half the buffing angle (i.e. about 22.5° when the substrates are at 45° with respect to one another.

In view of the typical 45° tilt angle in most ferroelectric liquid crystals, a 45° twist device was tested to verify the alignment of the molecules within this twist geometry. In this case, strong and weak buffings provide similar results. This is believed to be due to the helix 27 formed between the two buffing directions, as shown in FIG. 4. Without applied voltage, molecules splayed twisted between the two substrates. With positive and negative voltages applied to the cells, molecules are switched to the two states corresponding to the respective buffing directions. With a 45° angle separation between the states, the ferroelectric liquid crystal cell forms a substantially perfect intensity modulator when $\Delta n \, d/\lambda$ is selected to provide a halfwave plate.

Figure 5:
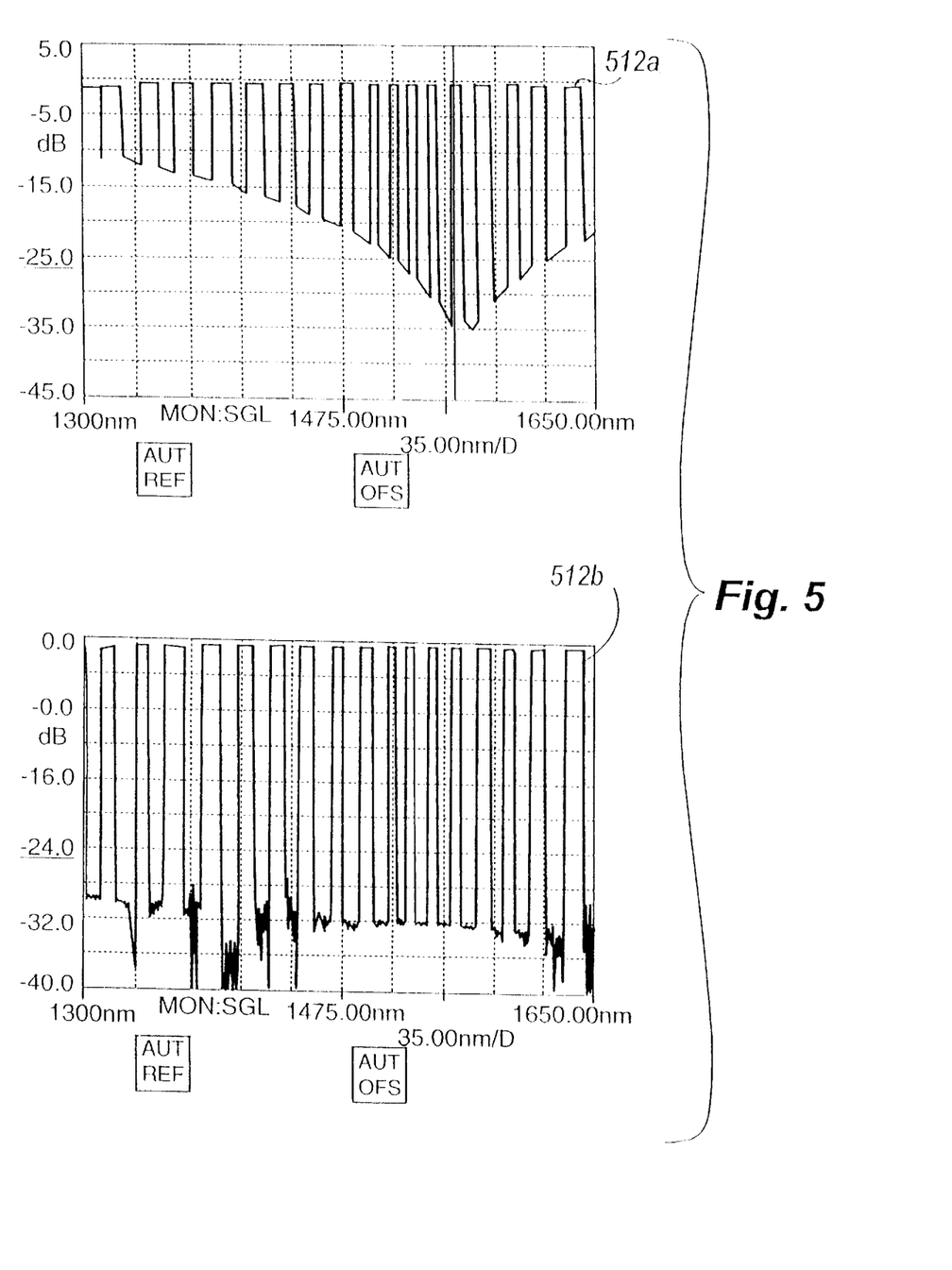
FIG. 5 is a graph showing contrast, in dB, as a function of wavelength in an example using an analog modulation device, according to an embodiment of this invention for a twist angle of 45°.
Figure 6:
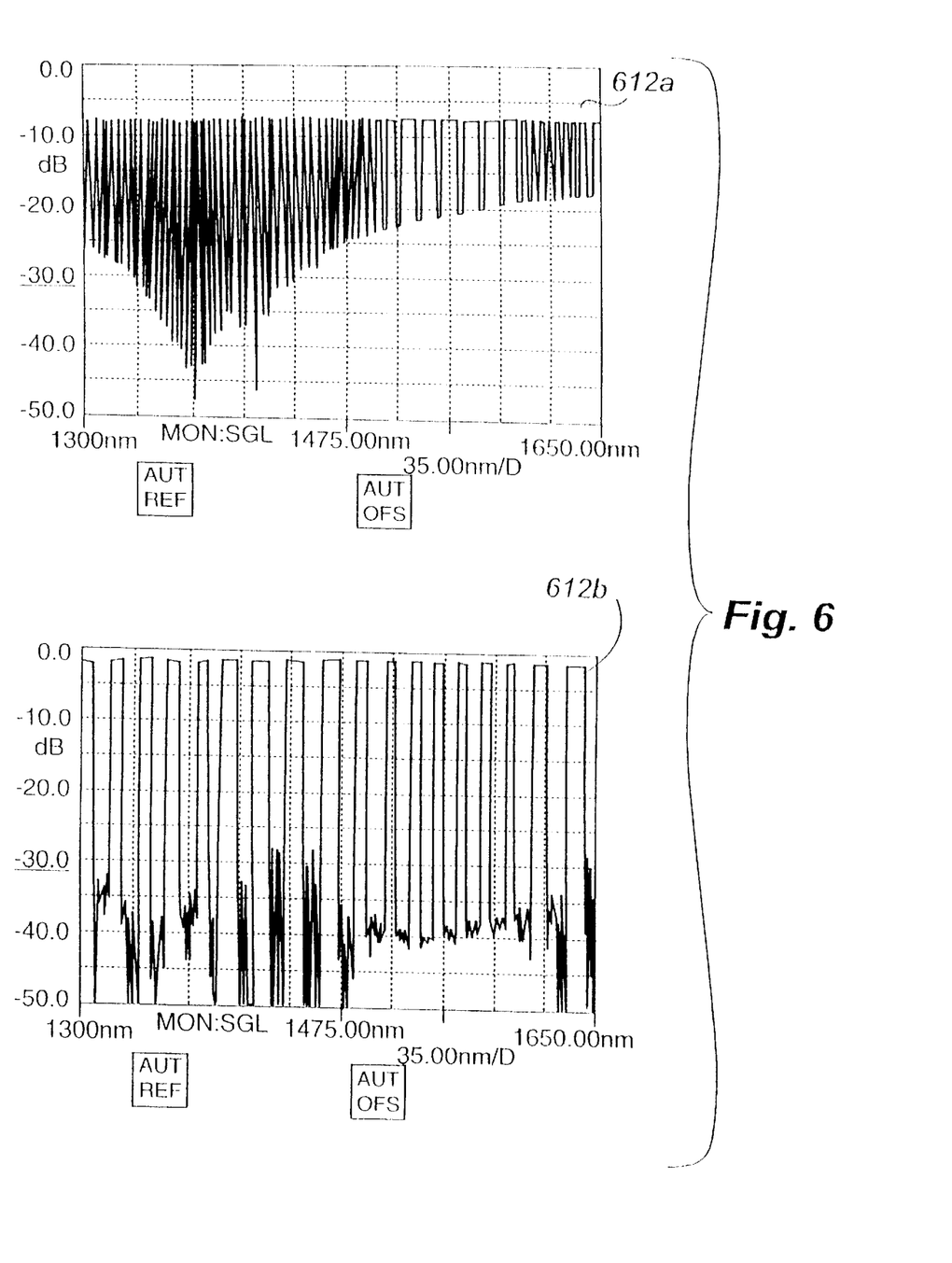
FIG. 6 is a graph showing contrast, in dB, as a function of wavelength in an example using an analog modulation device, according to an embodiment of this invention for a twist angle of 90°.
Figure 7:
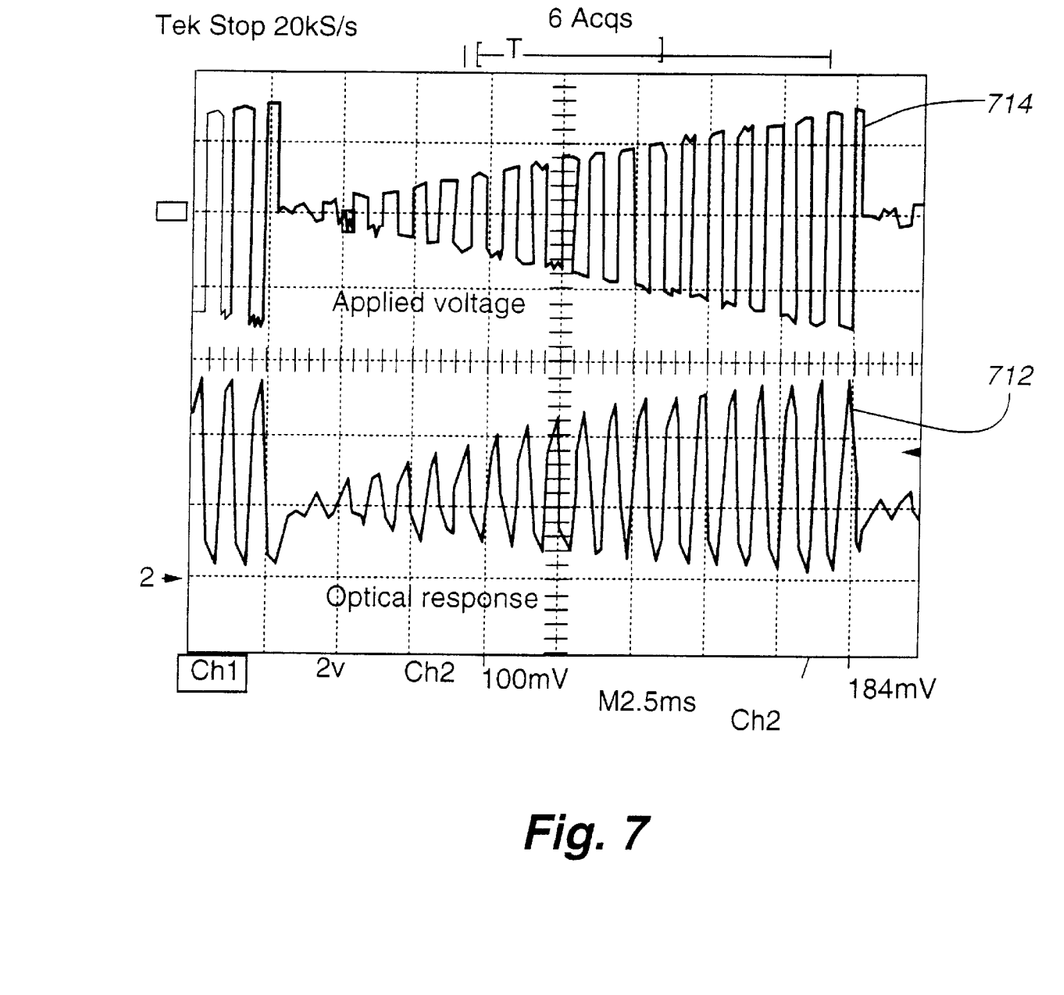
FIG. 7 is a graph comparing applied voltage and optical response for analog modulation using a device according to an embodiment of the present invention.

Optical performance of twisted ferroelectric liquid crystal cells, according to an embodiment of the present invention, is shown in FIGS. 5 and 6, for twist angles of 45° and 90°, respectively. High contrast 512a,b, such as >20 dB, and preferably extremely high contrast of >30, e.g. using parallel polarizers, and >40 dB e.g. using crossed polarizers, is achieved. The high/low spectral response shown in FIGS. 5 and 6 is due to a driving voltage that is switched between two voltage states, $\pm V_{op}$. When $V_{op}$ is greater then the threshold voltage Vth of the liquid crystal, the molecules are switched between two states with an effective cone angle qt. However, when $V_{op}<V_{th}$, analog modulation can be obtained. FIG. 7 shows the results 712 of analog modulation 714 in connection with a device according to an embodiment of the present invention. The twisted ferroelectric liquid crystal structure in this embodiment not only provides what is believed to be the highest contrast ratio that is reported to date, but also maintains analog modulation characteristics that are not available with conventional ferroelectric liquid crystal devices.

Figure 8:
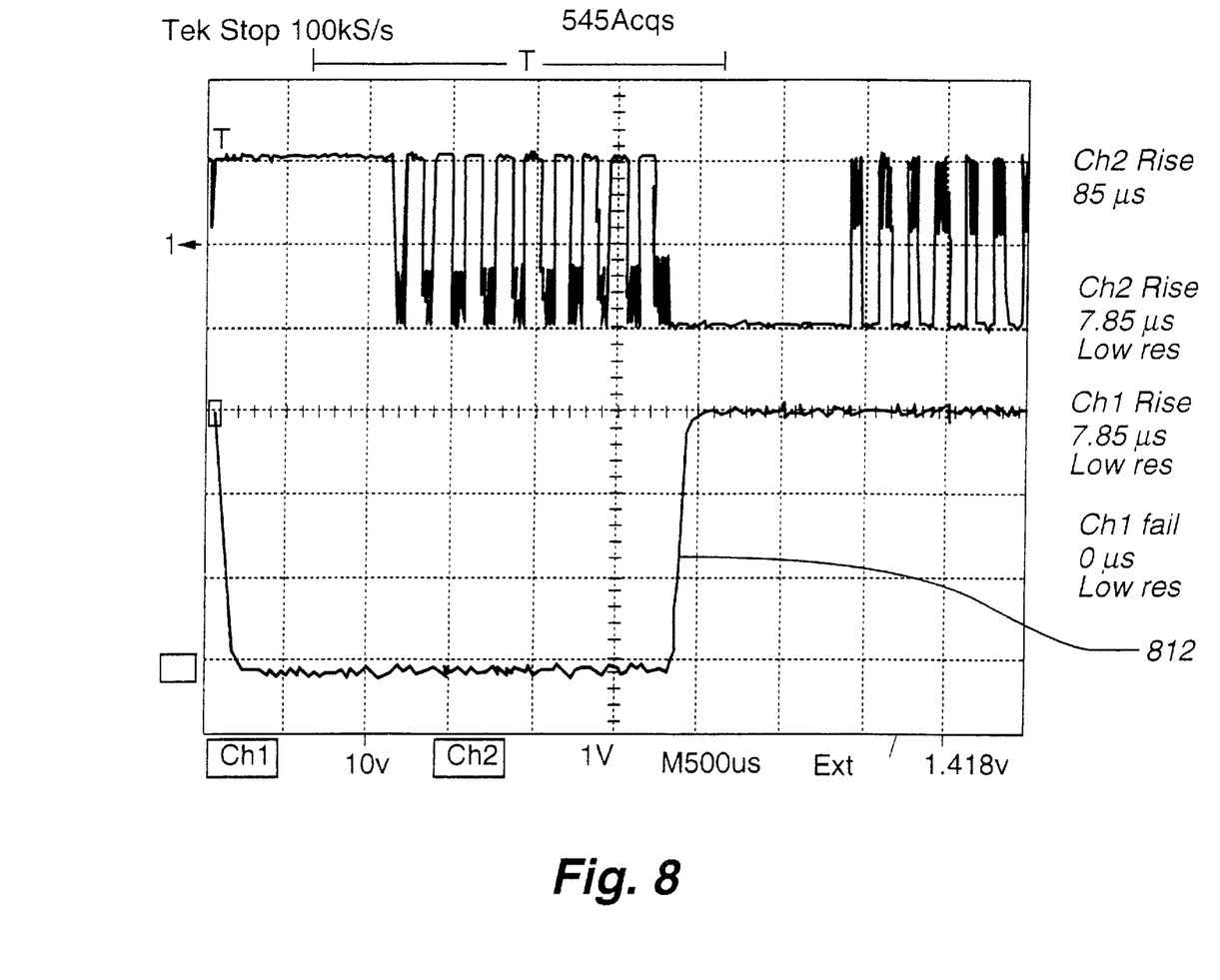
FIG. 8 is a graph illustrating switching time of a twisted ferroelectric liquid crystal modulator according to an embodiment of the present invention.

The switching time of a twisted ferroelectric liquid crystal modulator 812, according to an embodiment of the present invention, as illustrated in FIG. 8, has been characterized as being on the order of about 50 to 100 $\mu$sec, which is believed to be at least as low as that in conventional parallel FLC modulators.

Figure 9:
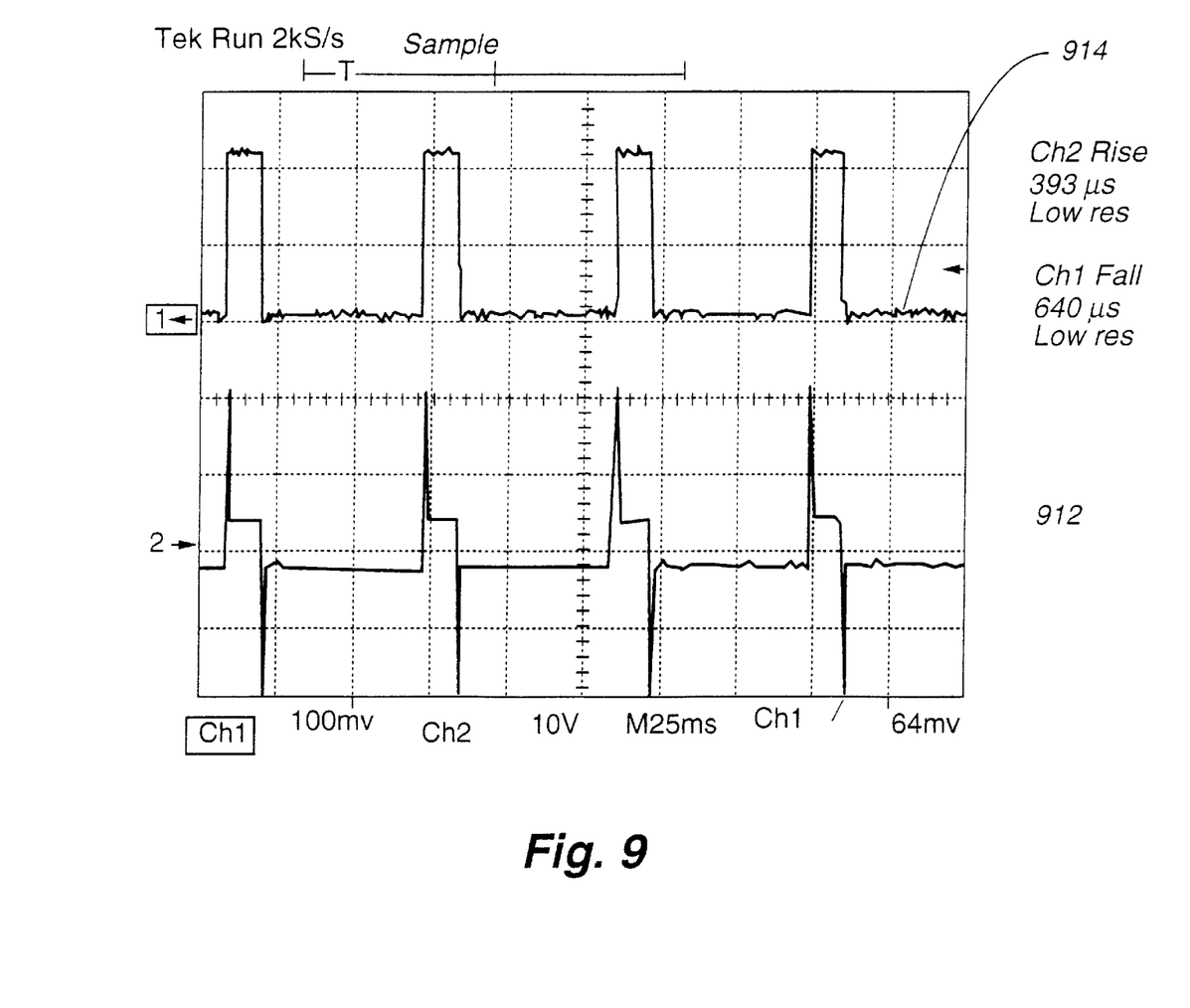
FIG. 9 is a graph illustrating modulator switching in response to an applied pulse in a device according to an embodiment of the present invention.

Twisted ferroelectric liquid crystal modulators according to an embodiment of the present invention display a quasi-binary optical response. As shown in FIG. 9, the modulator switches the corresponding state 912 when a pulse 914 is applied to the modulator. The molecules can be held steadily at their position, without relaxation, with a relatively small holding voltage, such as about 2V.

Figure 10A:
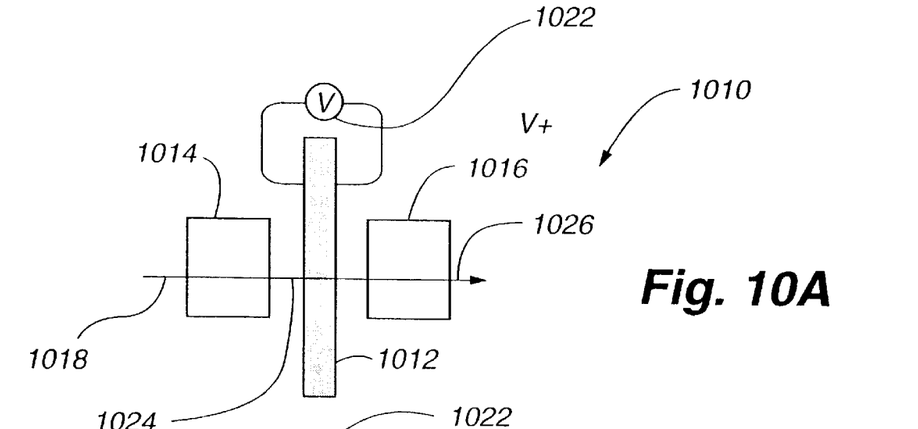
FIGS. 10A and 10B are schematic diagrams of a modulation device, according to an embodiment of the present invention, providing light output along first and second paths, respectively.
Figure 10B:
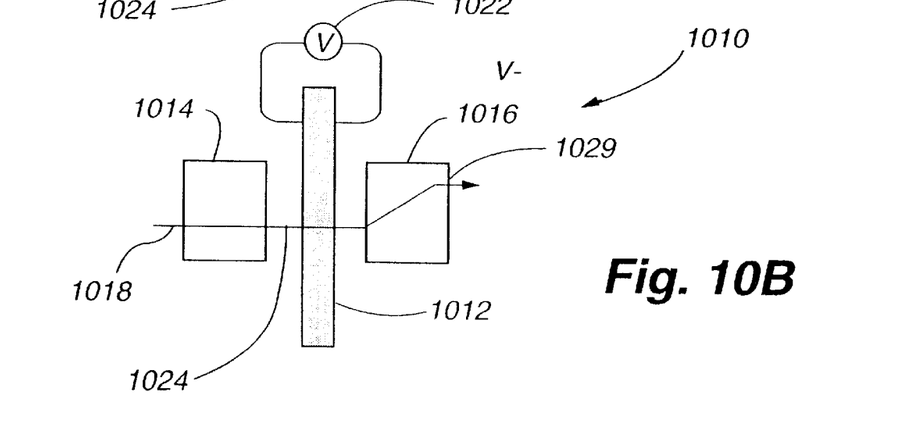

As illustrated in FIG. 10 a modulator, provided according to embodiments of the present invention includes a Twisted FLC 1012 positioned between a first polarizing element 1014 and an output birefringent element 1016. Any of a number of commercially available polarizing elements and birefringent elements may be used. One example of an operable polarizing element is that available from Newport Optics of Irvine Calif. and sold under the trade name POLARIZER One example of an operable birefringent element is that available from Melles Geriot of Irvine Calif. and sold under the trade name BEAM DISPLACER. In use, an input lightwave 1018 is transmitted to the first polarizing element 1014. The input lightwave may be, for example, coherent light or laser light, such as is commonly provided as output from a diode laser. The input lightwave 1018 is polarized by the first polarizing element 1014. In the configuration depicted in FIG. 10A, the Twisted FLC is of a type such that, when a voltage source 1022 provides a first positive voltage (e.g. 10 volts) across the Twisted FLC 1022, the polarized lightwave 1024 emerging from the first polarizer 1014 is essentially unrotated (i.e, is rotated 0°) by the Twisted FLC 1012. A number of voltage sources 1022 can be used. Operable voltage sources include those available from Hewlett Packard, Inc. The birefringent element 1016, is configured to transmit the lightwave received from the twisted FLC 1012 in an unrotated state, essentially undeflected to define a first output path 1026 for the output light. In the configuration of FIG. 10B, when the voltage source 1022 provides a second, different voltage, e.g. a negative voltage, such as −10 volts, across the twisted FLC 1022, the polarized lightwave 1024 emerging from the first polarizer 1014 is rotated, e.g. by 90°, by the twisted FLC 1012. The birefringent element 1016 is configured to transmit the rotated lightwave received from the twisted FLC 1012 in a deflected fashion to define a second output path 1028 for the output light, different from the first output path 1026. In this fashion the modulator 1010 acts to change the path of lightwave 1018 in response to a change in voltage. This setup results in a structure that can provide for a polarization-dependent optical router.

Figure 11A:
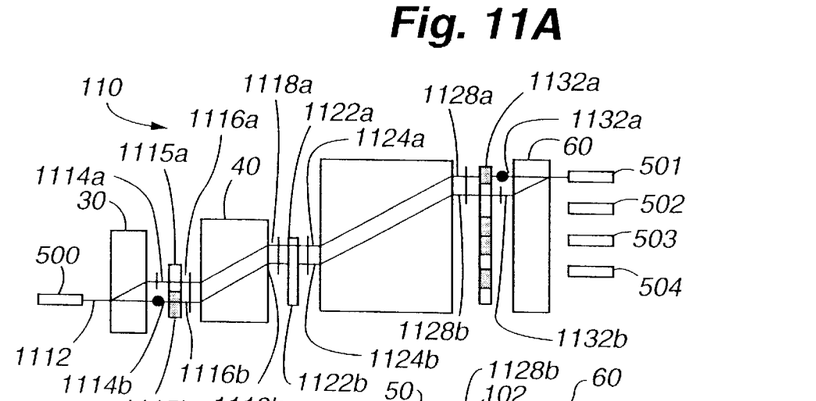
FIGS. 11A–D are schematic diagrams of a one by four switch, according to an embodiment of the present invention, providing light output along first, third, second and fourth paths respectively.

One example of a system in which the modulator of the present invention can be used is a telecommunications system. FIG. 11A depicts one example of a 1×4 (one input, four outputs) optical routing system. In FIGS. 3A through 3D, there is one light source 500 and four possible output ports 501, 502, 503 and 504. The system of FIG. 11A includes first, second, third and fourth birefringent elements 30, 40, 50, 60. The system of FIG. 11A also includes first, second and third polarization rotators 100, 101, 103, each of which may have a plurality of elements (as described below), with each element being a (separately-controllable) voltage-responsive rotator as described above. In the illustration of FIGS. 11A–11D, elements which are set to provide polarization rotation are shown shaded. The system of FIG. 11A provides an optical routing switch configured to rout an input signal 1112, such as light from a coherent light source 500, to output port 501. Light 1112 is provided to a first polarizing element 30 which outputs a horizontally oriented beam 1114a and a vertically oriented beam 1114b, After the light 1112 passes through a first polarizer 30, a first polarization rotator array 100, which may be, for example a twisted FLC modulator component, is set (e.g. by application of an appropriate voltage from a voltage source, not shown) to rotate the vertically polarized beam 1114b to horizontal polarization, so that both light beams 1116a, 1116b, upon exiting the first polarization rotator array 100, are horizontally polarized. These horizontally-polarized beams are redirected upward in the second birefringent element 40, because they are "seen" or treated as extra-ordinary waves in this birefringent element 40. The two beams then enter a second array of polarization rotator array 101, which as two elements 1122a, 1122b. The second array 101 preferably comprises twisted FLC's as described above. In FIG. 11A, the second polarization rotator array 101 is set so that, at least for the region where the light beams 1118a, 1118b are received, no polarization rotation is provided, and the light beams retain their horizontal rotation 1124a, 1124b upon exiting. The beams ten enter a third birefringent element 50, that has a thickness twice that of the second birefringent element 40. The horizontally polarized beams are redirected upward in the third birefringent element 50 because they are "seen" or treated as extra-ordinary waves in this birefringent element 50. The two beams exiting the third bireflingent element 1128a,b continue to have the same (horizontal) polarization as they reach the third array of polarization rotators 102. This array 102 has four pairs of pixels or sub-elements 1132a,b, 1134a,b, 1136a,b, 1138a,b, FIG. 11E. As shown in FIG. 11A, one of the sub-elements is set (e.g. by application of voltage) to convert one of the beams 1128 to vertical polarization so that the beam pair 1132a, 1132b becomes orthogonally polarized again. These two orthogonal beams 1132a,b are recombined by a fourth birefringent element 60 and exit at output port 501.

Figure 11B:
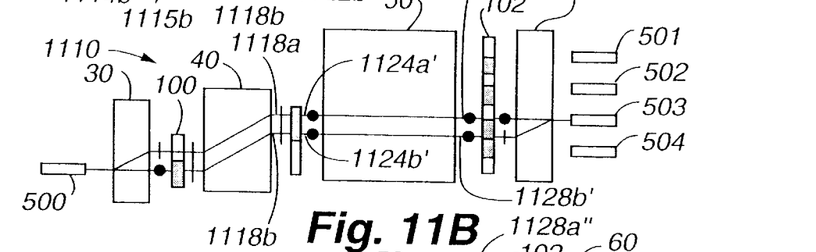

FIG. 11B shows the switch of FIG. 11 configured to couple light from the input port 500 to the third output port 503. In this configuration, the upper sub-element of the second polarization rotator array 101 is set (by selectable application of a voltage) to rotate the polarization of both beams 1118a,b by 90° sot that the beams 1124a', 1124b' output by the second polarization array 101 have vertical polarization. The nature and configuration of the third birefringent element 50 is such that the vertically polarized input beams 1124a', 1124b' are "seen" or treated, by the third birefringent element 50, as ordinary waves. Therefor, no deviation occurs and the beams travel substantially straight through the third birefringent element 50. The two vertically-polarized beams reach the third polarization array 102 which is set (by application of a voltage) to convert one beam 1128b' to horizontal polarization. The resulting orthogonally-polarized beams are recombined by the forth birefringent element 60 and exit at output port 503.

Figures 11C, 11D, 11E:
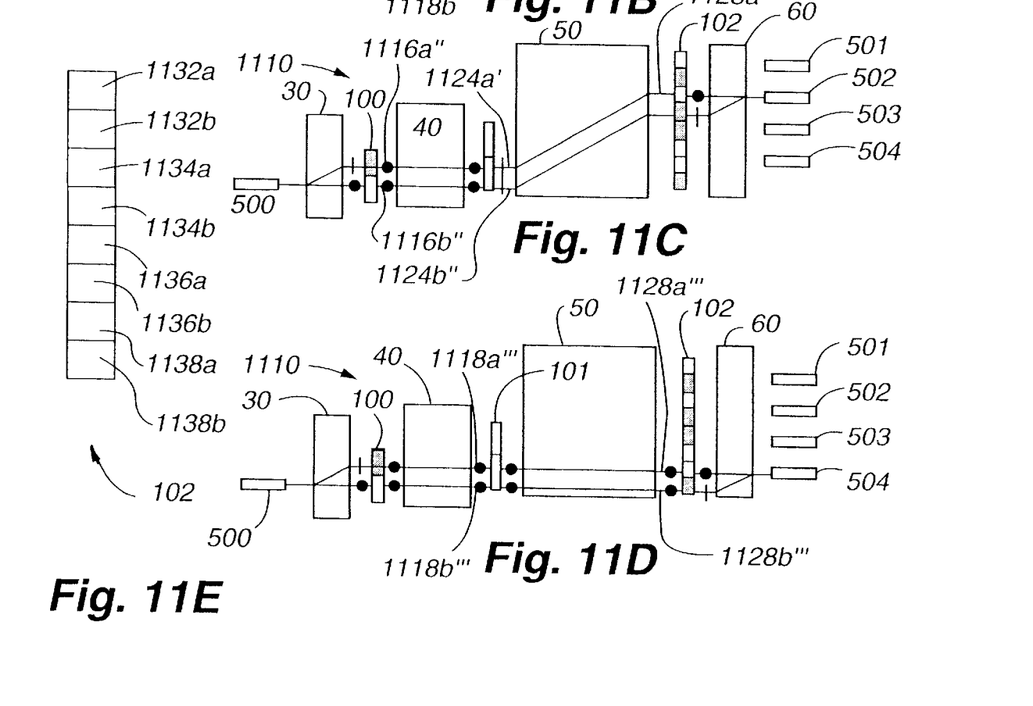
FIG. 11E is an enlarged schematic depiction of the third rotator of FIG. 11A.

FIG. 11C shows the switch 1110 configured to couple the light from the input port 500 to the second output port 502. In this configuration, the control states of the sub-elements 1115a, 1115b in the first polarization rotator array 100 are reversed with respect to those shown in FIGS. 11A and 11B, so that both beams 1116a', 1116b" output by the first polarization rotator array 100 are vertically polarized. The vertically-polarized beams are "seen" or treated as ordinary waved by the second birefringent element 40 and therefore propagate substantially straight through birefringent element 40. The second polarization rotator array 101 is set (by selectable application of a voltages) to rotate the polarizations of both beams by 90°, so that they become horizontally polarized. These two horizontally polarized beams 1124a", 1124b" are "seen" or treated as extra-ordinary waves in the third birefringent element 50, and therefore travel upward withing the third birefringent element 50. Both beams travel to the third polarization rotator array 102 which converts one of the beams 1128a" to vertical polarization. The resulting orthogonally-polarized beams are recombined by the fourth birefringent element go and exit to output port 502.

FIG. 11D shows the switch 1110 configured to couple the input port 500 to output port 504. In this configuration, the second polarization rotator array 101 is set to provide no polarization rotation, so that the two light beams 1118a'", 1118b'" maintain their vertical polarizations. These two vertically-polarized beams are "seen" or treated by the third birefringent element 50 as ordinary waves, and therefore travel substantially straight through the third birefringent element 50. The two vertically-polarized beams 1128a'", 1128b'" travel to the third polarization rotator array 102 which is set (by selectable application of voltages) to change the polarization of one of the beams 1128b'" to horizontal. The resulting orthogonal beams are recombined by the fourth birefringent element 60 and exit to output port 504.

Figure 12:
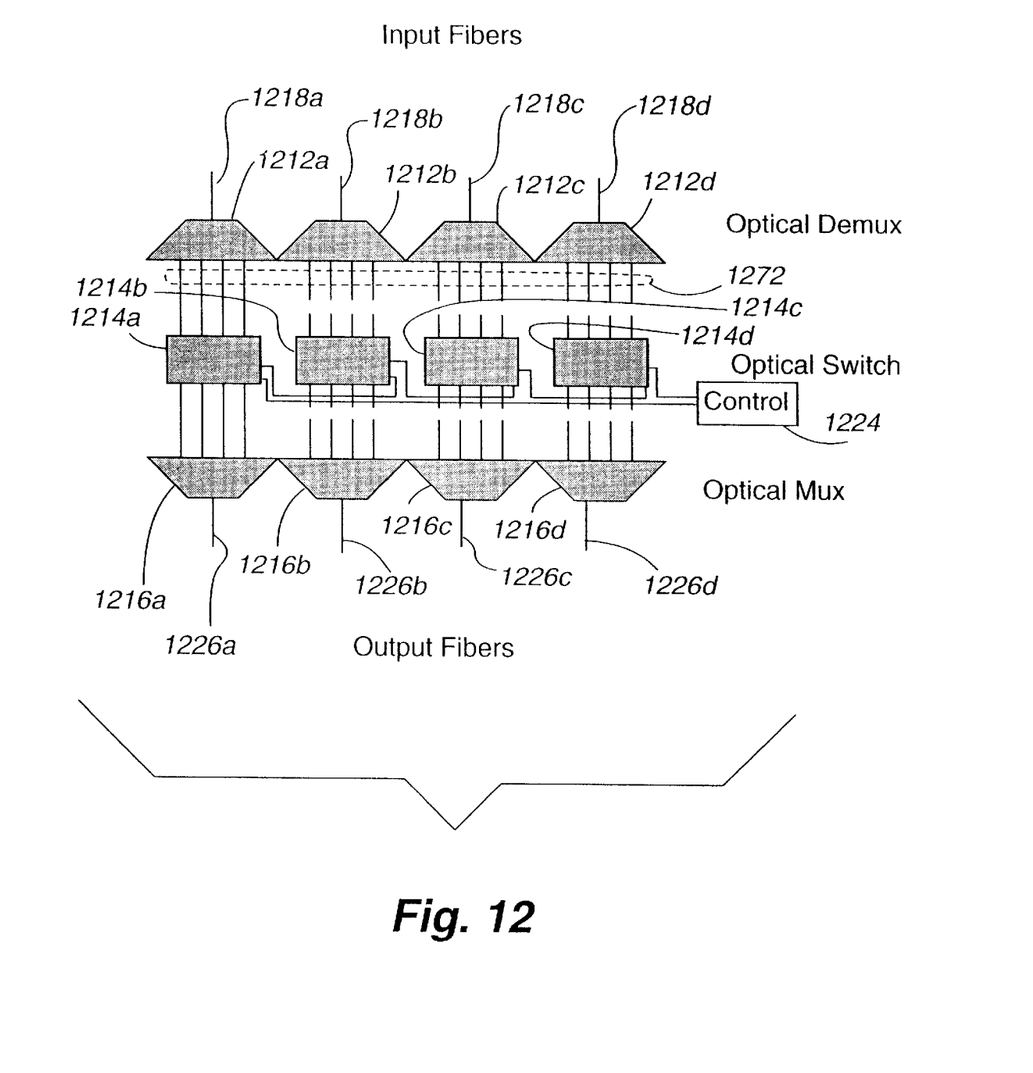
FIG. 12 is a schematic diagram of an optical crossconnect, according to an embodiment of the present invention.

FIG. 12 depicts one potential application of switches similar to those depicted in FIGS. 11A–11D, to provide an optical crossconnect (OCX). The depicted OCX includes arrays of optical demultiplexers 1212a,b,c,d. 4×4 switches 1214a,b,c,d and optical multiplexers 1216a,b,c,d. Although, in the depicted configuration, there are four elements of each type, more or fewer elements can be used. In use, input optical fibers 1218a,b,c,d each carry multiple optical channels (wavelengths). Each demultiplexer 1212a,b,c,d separates the optical channels spatially to provide a total of 16 channels 1222 in the depicted embodiment. The 16 channels are then routed through the four 4×4 switches 1214a,b,c,d which are provided with control signals (selectably applied voltages) from a control unit 1224 to route the signals to provide a desired and selectable rearrangement. After the rearrangement, the channels are recombined by the multiplexers 1216a,b,c,d and sent to the output fibers 1226a,b,c,d.

In light of the above description, a number of advantages of the present invention can be seen. The present invention provides an electro-optic modulator with high contrast, fast response time, low driving voltage and which can be used in both analog and binary modes. The present invention is particularly useful in the context of optical switching and modulation devices, such as for use in telecommunications application.

A number of variations and modifications of the invention can be used. Although the ferroelectric cell has been described for use in a modulator, it can also be used for other purposes, including as an optical signal-processing unit, such as an optical correllator for image processing applications. Although the invention has been described in connection with use in a telecommunications system, the invention can be used for other purposes, including display applications, such as flat panel displays. Although an embodiment of the invention provides light buffing on each alignment layer, it is possible to provide heavier buffing on one layer than on the other. Although buffing with silk has been described, alignment directions can also be created by other techniques such as angle SiO evaporation.

What is claimed is:

1. A twisted non-surface-stabilized ferroelectric liquid crystal electro-optic modulator, comprising:

a first assembly having a first electrode and a first buffed alignment layer having a first buffing direction, for aligning a first adjacent portion of said ferroelectric liquid crystal;

a second assembly having a second electrode and a second buffed alignment layer, having a second buffing direction at an angle of from about 44° to about 90° from said first buffing direction, for aligning a second adjacent portion of said ferroelectric liquid crystal; and ferroelectric liquid crystal material positioned between said first and second assembly, in contact with said first and second buffed alignment layers, said ferroelectric liquid crystal material having a room temperature cone angle between about 20° and about 25°, said first buffed alignment layer and said second buffed alignment layer providing an anchoring energy, wherein said ferroelectric liquid crystal material is provided with a pre-tilt angle of between about 3 degrees and about 7 degrees; and a voltage source configurable for providing an applied voltage across said first and second electrodes.

2. A twisted ferroelectric liquid crystal electro-optic modulator, as claimed in claim 1, wherein said modulator is constructed such that said anchoring energy is a weak anchoring energy wherein molecules of said liquid crystal material adjacent said first and second buffed alignment layers are non-parallel with said buffing directions.

3. A twisted ferroelectric liquid crystal electro-optic modulator, as claimed in claim 1, further comprising parallel input and output polarizers, and wherein said modulator, when actuated, provides contrast of at least about 30 dB.

4. A twisted ferroelectric liquid crystal electro-optic modulator, as claimed in claim 1, further comprising crossed input and output polarizers, and wherein said modulator, when actuated, provides contrast of at least about 20 dB.

5. A twisted ferroelectric liquid crystal electro-optic modulator, as claimed in claim 1, wherein said modulator provides a switching time of less than about 100 $\mu$sec.

6. A twisted ferroelectric liquid crystal electro-optic modulator, as claimed in claim 1, wherein said modulator provides a switching time of less than about 50 $\mu$sec.

7. A twisted ferroelectric liquid crystal electro-optic modulator, as claimed in claim 1, wherein said modulator is provided with an effective cone angle less than the intrinsic cone angle of said ferroelectric liquid crystal material.

8. A twisted ferroelectric liquid crystal electro-optic modulator, as claimed in claim 1, wherein said modulator is provided with an optical transmission loss of less than about 20%.

9. A twisted ferroelectric liquid crystal electro-optic modulator, as claimed in claim 1, wherein said modulator exhibits bimodal modulation when the magnitude of said applied voltage exceeds a first threshold voltage, and exhibits analog modulation related to the voltage magnitude, when said magnitude of said applied voltage is less than said threshold voltage.

10. A twisted ferroelectric liquid crystal electro-optic modulator, as claimed in claim 1, wherein said modulator changes state when a voltage pulse is applied to said modulator.

11. A twisted ferroelectric liquid crystal electro-optic modulator, as claimed in claim 1, wherein following a change in state, the voltage needed to maintain molecules of said ferroelectric liquid crystal in position is less than about 2V.

12. A non-surface stabilized twisted ferroelectric liquid crystal electro-optic modulator, comprising:

a first assembly having first electrode means and first alignment means, having a first direction, for aligning a first adjacent portion of ferroelectric liquid crystal;

a second assembly having second electrode means and second alignment means, having a second direction at an angle of from about 44° to about 90° from said first direction, for aligning a second adjacent portion of ferroelectric liquid crystal; and ferroelectric liquid crystal material positioned between said first and second assemblies, in contact with said first and second alignment means, said ferroelectric liquid crystal material having a room temperature cone angle between about 20° and about 25°, said first alignment means and said second alignment means including means for providing an anchoring energy wherein molecules of said liquid crystal material adjacent said first and second alignment means are non-parallel with said first and second directions, respectively wherein said ferroelectric liquid crystal material is provided with a pre-tilt angle of between about 3 degrees and about 7 degrees, and means for providing an applied voltage across said first and second electrodes.

13. A twisted ferroelectric liquid crystal elecro-optic modulator as claimed in claim 12 wherein said means for providing an anchoring energy is a means for providing a weak anchoring energy.

14. A Twisted ferroelectric liquid crystal eletro-optic modulator as claimed in claim 12 wherein said means for providing an anchoring energy is a means for providing a strong anchoring energy.

15. A telecommunication switching system, comprising:

at least a first modulator having ferroelectric crystal material wherein said ferroelectric liquid crystal material is provided with a pre-tilt angle of between about 3 degrees and about 7 degrees and wherein said ferroelectric liquid crystal material has as an intrinsic property a cone angle of about 22° between lightly buffed first and second alignment layers, wherein a buffing direction of said first alignment layer forms an angle of about 90° to 44° with a buffing direction of said second alignment layer;

a light source for providing light to said first modulator;

a controllable voltage source wherein said light follows a first path when said voltage source provides a first voltage to said ferroelectric crystal material and a second path when said voltage source provides a second voltage to said ferroelectric crystal material.

16. A telecommunication switching system, comprising:

at least a first modulator having ferroelectric crystal material between strongly buffed first and second alignment layers defining first and second buffing directions which are about 45° apart, wherein said ferroelectric crystal material has as an intrinsic property a cone angle of about 22°;

a light source for providing light to said first modulator;

a controllable voltage source wherein said light follows a first path when said voltage source provides a first voltage to said ferroelectric crystal material and a second path when said voltage source provides a second voltage to said ferroelectric crystal material.

* * * * *

UNITED STATES PATENT AND TRADEMARK OFFICE
CERTIFICATE OF CORRECTION

PATENT NO. : 6,141,076  
DATED : October 31, 2000  
INVENTOR(S) : Liu et al.

Page 1 of 1

It is certified that error appears in the above-identified patent and that said Letters Patent is hereby corrected as shown below:

After the title by inserting the following:

GOVERMENT INTERESTS  
The invention was made with Goverment support under DARPA II: DAH01-97-C-R308 awarded by U.S. Army Missile Command, AMSMI-AC-CRAY, Redstone Arsenal, AL 35898. The Goverment has certain rights in the invention. --

Signed and Sealed this

Thirtieth Day of October, 2001

Attest:

NICHOLAS P. GODICI  
Attesting Officer        Acting Director of the United States Patent and Trademark Office